United States Patent
Moyal et al.

(10) Patent No.: US 12,318,941 B2
(45) Date of Patent: Jun. 3, 2025

(54) MATERIAL MOVEMENT TRACK TO ASSIST ROBOTIC ARM

(71) Applicant: International Business Machines Corporation, Armonk, NY (US)

(72) Inventors: Shailendra Moyal, Pune (IN); Sarbajit K. Rakshit, Kolkata (IN); Rasika Ashirwad Vyawahare, Pune (IN); Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 17/935,954

(22) Filed: Sep. 28, 2022

(65) Prior Publication Data

US 2024/0100696 A1   Mar. 28, 2024

(51) Int. Cl.
| | |
|---|---|
| *B25J 9/16* | (2006.01) |
| *B25J 9/00* | (2006.01) |
| *B25J 19/02* | (2006.01) |
| *B65G 47/90* | (2006.01) |

(52) U.S. Cl.
CPC ............ *B25J 9/1664* (2013.01); *B25J 19/02* (2013.01); *B65G 47/905* (2013.01); *B25J 9/0084* (2013.01); *B25J 9/1682* (2013.01); *B65G 47/904* (2013.01); *G05B 2219/39117* (2013.01)

(58) Field of Classification Search
CPC ...... B25J 9/1664; B25J 9/1682; B25J 9/0084; B25J 19/02; B65G 47/904; B65G 47/905; G05B 3329/39117
See application file for complete search history.

(56) References Cited

U.S. PATENT DOCUMENTS

| | | | |
|---|---|---|---|
| 10,865,043 B1 | 12/2020 | Garcia | |
| 2018/0264648 A1* | 9/2018 | Kim | B25J 19/02 |
| 2019/0344447 A1* | 11/2019 | Wicks | B25J 19/02 |
| 2020/0229544 A1 | 7/2020 | Regan | |
| 2021/0016451 A1* | 1/2021 | Maeda | B65G 47/905 |

FOREIGN PATENT DOCUMENTS

| | | |
|---|---|---|
| CN | 110883515 A | 3/2020 |
| CN | 111761347 A | 10/2020 |

* cited by examiner

Primary Examiner — Thomas E Worden
Assistant Examiner — Jay Khandpur
(74) Attorney, Agent, or Firm — Edward J. Wixted, III

(57) ABSTRACT

In an approach for improving robotic automation systems, a processor receives a request for a set of materials for an activity to be performed. A processor identifies one or more materials of the set of materials. A processor determines a sequence of operations to move the one or more materials. A processor prompts a first robot to pick a first material at the place of origination using a clamping system and to deposit the first material in a first micro trolley. Responsive to determining an arm of the first robot is in a first orientation, a processor moves the first material along a first track on an arm of a multi-robotic system from the place of origination to the place of destination. A processor prompts a second robot to pick the first material from the first micro trolley at the place of destination using the clamping system.

20 Claims, 4 Drawing Sheets

MATERIAL MOVEMENT TRACK TO ASSIST ROBOTIC ARM

BACKGROUND OF THE INVENTION

The present invention relates generally to the field of data processing, and more particularly to a method and system for material movement with robotic arm using material movement track to assist the robotic arm.

Manufacturing is the assembly of finished goods for sale or use from raw materials. The assembly of finished goods may occur by the use of manual labor or robotic automation and is typically carried out systemically with a division of labor. Robotic automation systems are utilized in manufacturing to assemble, disassemble, package and label, palletize, inspect, and test products. Robotic automation systems use sensors and sensor fusion components to function. Robotic automation systems pick products off conveyor belts and place them in a desired location. Robotic automation systems are used in manufacturing industries including, but not limited to, industries that produce goods (i.e., food, beverages, clothing, cosmetics, toiletries, etc.), medications, medical devices, healthcare supplies, furniture, sports equipment, toys, computers, consumer electronics, electrical equipment, heavy machinery, building materials, tools, chemicals, refined petroleum products, steel, ships, aircrafts, and automobiles. Robotic automation systems have been applied in these manufacturing industries to improve performance, productivity, and work quality.

SUMMARY

Aspects of an embodiment of the present invention disclose a method, computer program product, and computer system for improving current robotic automation systems. Responsive to receiving a request for a set of materials required for an activity to be performed by a robotic system, a processor identifies one or more materials of the set of materials. A processor determines a sequence of operations to move the one or more materials from a place of origination to a place of destination. A processor prompts a first robot to pick a first material from the set of materials at the place of origination using a clamping system and to deposit the first material in a first micro trolley. Responsive to determining an arm of the first robot is in a first orientation to move the first micro trolley from the place of origination to the place of destination, a processor moves the first material in the first micro trolley along a first track on an arm of a multi-robotic system from the place of origination to the place of destination. A processor prompts a second robot to pick the first material from the first micro trolley at the place of destination using the clamping system.

In some aspects of an embodiment of the present invention, a processor determines where the one or more materials are to be picked up. A processor determines where the one or more materials are to be deposited.

In some aspects of an embodiment of the present invention, a processor determines when the one or more materials will be required for the activity. A processor determines whether the one or more materials can be aggregated in the first micro trolley based on one or more factors.

In some aspects of an embodiment of the present invention, the one or more factors includes each respective place of origination of the one or more materials, each respective place of destination of the one or more materials, a quantity of the one or more materials, a size of the one or more materials, and each respective micro trolley expected to be used to carry the one or more materials.

In some aspects of an embodiment of the present invention, prior to determining the sequence of operations to move the one or more materials from the place of origination to the place of destination, a processor identifies one or more robots on a pathway from the place of origination to the place of destination. A processor determines a location of each robot of the one or more robots on the pathway from the place of origination to the place of destination. A processor considers one or more factors relevant to each robot of the one or more robots on the pathway from the place of origination to the place of destination.

In some aspects of an embodiment of the present invention, the one or more factors includes a current activity being performed by each robot of the one or more robots on the pathway from the place of origination to the place of destination and an amount of time required for the current activity to be performed.

In some aspects of an embodiment of the present invention, the sequence of operations includes at least one of one or more materials to be moved, an order the one or more materials will be moved, a first robot to pick the one or more materials from the set of materials at the place of origination, a second robot to pick the one or more materials from the first micro trolley at the place of destination, a list of micro trolleys to be used to carry the plurality of materials, a determination of which micro trolley will carry which material, and a determination of whether any of the materials will be aggregated and moved together in a similar micro trolley.

In some aspects of an embodiment of the present invention, a processor identifies an orientation of the arm of the first robot. A processor determines the arm of the first robot is in a first orientation.

In some aspects of an embodiment of the present invention, prior to moving the first material in the first micro trolley along the first track on the arm of the multi-robotic system from the place of origination to the place of destination, a processor creates a multi-robotic material movement track by aligning the first track on the arm of the first robot with the second track on the arm of the second robot.

In some aspects of an embodiment of the present invention, subsequent to prompting the second robot to pick the first material from the first micro trolley at the place of destination using the clamping system, a processor checks the first material for a quality issue. Responsive to determining there is a quality issue with the first material, a processor prompts the first robot to pick the first material from the first set of materials again.

In some aspects of an embodiment of the present invention, subsequent to prompting the second robot to pick the first material from the first micro trolley at the place of destination using the clamping system, a processor returns the first micro trolley to the place of origination. A processor determines whether there is a second material from the set of materials required for the activity to be performed by the robotic system.

In some aspects of an embodiment of the present invention, responsive to determining there is a second material required for the activity to be performed by the robot, a processor prompts the first robot to pick the second material from the one or more materials proactively without any discontinuity in the activity to be performed by the robot.

These and other features and advantages of the present invention will be described in, or will become apparent to

DETAILED DESCRIPTION

Embodiments of the present invention recognize that manufacturing is the assembly of finished goods from raw materials for sale or use. The assembly of finished goods may occur by the use of manual labor or robotic automation and is typically carried out systemically with a division of labor.

Embodiments of the present invention recognize that, over the last few decades, the use of robotic automation systems in manufacturing has steadily increased. Combining traditional manufacturing methods with robotic automation systems has transformed the manufacturing industry. Robotic automation systems are used to assemble, disassemble, package and label, palletize, inspect, and test products. Robotic automation systems use sensors and sensor fusion components to function. Robotic automation systems pick products off conveyor belts and place them in a desired location.

Embodiments of the present invention recognize that advantages commonly attributed to the use of robotic automation systems in manufacturing includes higher production rates and increased productivity, more efficient use of materials, better product quality, improved safety, shorter workweeks for labor, and reduced factory lead times.

Embodiments of the present invention recognize, however, that before beginning to assemble a product, a robot must pick one or more required parts from storage trays. The one or more required parts may include, but are not limited to, springs, gear wheels, batteries, control circuits, pivotal joints, body parts of any final product, etc. Having to pick a required part from a storage tray each time a part is needed is ineffective and requires time that can be spent assembling the product. Therefore, embodiments of the present invention recognize the need for a system and method to move the one or more required parts directly from the storage trays to the robot.

Embodiments of the present invention provide a system and method to improve current robotic automation systems by adding a track that runs from end to end of an arm of a robot and that can move one or more required parts with or without the help of a motorized micro trolley from a place of origination to a place of destination.

Implementation of embodiments of the present invention may take a variety of forms, and exemplary implementation details are discussed subsequently with reference to the Figures.

Figure 1:
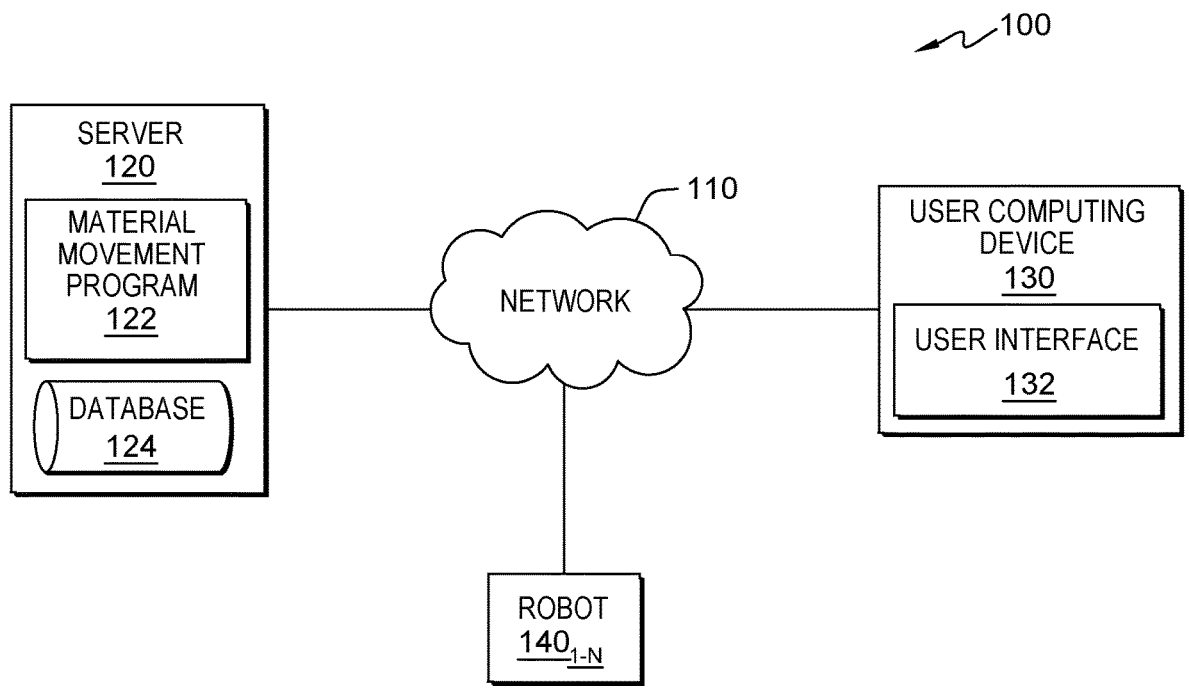
FIG. 1 is a block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120, user computing device 130, and robots $140_{1-N}$, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, robots $140_{1-N}$, and other computing devices (not shown) and robots (not shown) within distributed data processing environment 100.

Server 120 operates to run material movement program 122 and to send and/or store data in database 124. In an embodiment, server 120 can send data from database 124 to user computing device 130 and robots $140_{1-N}$. In an embodiment, server 120 can receive data in database 124 from user computing device 130 and robots $140_{1-N}$. In one or more embodiments, server 120 can be a standalone computing device, a management server, a web server, a mobile computing device, or any other electronic device or computing system capable of receiving, sending, and processing data and capable of communicating with user computing device 130 and robots$_{1-N}$ via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130, and robots $140_{1-N}$, and other computing devices (not shown) and robots (not shown) within distributed data processing environment 100 via network 110. Server 120 may include internal and external hardware components, as depicted and described in further detail in FIG. 4.

Material movement program 122 operates to improve current robotic automation systems by adding a track that runs from end to end of an arm of a robot and that can move one or more materials with or without the help of a motorized micro trolley from a place of origination to a place of destination. In the depicted embodiment, material movement program 122 is a standalone program. In another embodiment, material movement program 122 may be integrated into another software product, such as a manufacturing software (i.e., a tool that provides functionality to plan and execute projects from beginning to end, while automating materials planning, production tracking and scheduling, and product lifecycle management). In the depicted embodiment, material movement program 122 resides on server 120. In another embodiment, material movement program 122 may reside on user computing device 130, robots $140_{1-N}$, or on another computing device (not shown), provided that material movement program 122 has access to network 110. An exemplary diagram illustrating the plurality of components of robot $140_{1-N}$ is depicted and described in further detail with respect to FIG. 2. The operational steps of material movement program 122 are depicted and described in further detail with respect to FIG. 3.

In an embodiment, the user of user computing device 130 registers with material movement program 122 of server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via material movement program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by material movement program 122. A database is an organized collection of data. Data includes, but is not limited to, information about user preferences (e.g., general user system settings such as alert notifications for user computing device 130); information about alert notification preferences; previous requests for a set of materials; a sequence of operations including one or more robots (e.g., $140_{1-N}$) needed to move one or more materials (e.g., $225_{1-N}$ of FIG. 2) from a place of origination to a place of destination for a particular request for a set of materials, a place of origination of one or more materials, a place of destination of one or more materials, a quantity of the one or more materials, a size of the one or more materials, and a micro trolley (e.g., $215_1$ of FIG. 2) expected to be used to carry the one or more materials; an activity to be performed; an amount of time required for an activity to be performed by a robot (e.g., $140_{1-N}$); one or more previous activities performed by a robot (e.g., $140_{1-N}$); and any other data received, used, and/or generated by material movement program 122.

Database 124 can be implemented with any type of device capable of storing data and configuration files that can be accessed and utilized by server 120, such as a hard disk drive, a database server, or a flash memory. In an embodiment, database 124 is accessed by material movement program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that material movement program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Material movement program 122 enables the authorized and secure processing of personal data.

Material movement program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Material movement program 122 provides information regarding personal and/or confidential data and the nature (e.g., type, scope, purpose, duration, etc.) of the processing. Material movement program 122 provides the user with copies of stored personal and/or confidential company data. Material movement program 122 allows the correction or completion of incorrect or incomplete personal and/or confidential data. Material movement program 122 allows for the immediate deletion of personal and/or confidential data.

User computing device 130 operates to run user interface 132 through which a user can interact with material movement program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with material movement program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132.

User interface 132 operates as a local user interface between material movement program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from material movement program 122 to a user via network 110. User interface 132 can also display or present alerts including information (such as graphics, text, and/or sound) sent from material movement program 122 to a user via network 110. In an embodiment, user interface 132 is capable of sending and receiving data (i.e., to and from material movement program 122 via network 110, respectively). Through user interface 132, a user can opt-in to material movement program 122; create a user profile; set user preferences and alert notification preferences; input a request for a set of materials; receive quality reports including whether a material passed or failed a quality check; receive a request for feedback; and input feedback.

A user preference is a setting that can be customized for a particular user. A set of default user preferences are assigned to each user of material movement program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of material movement program 122.

Figure 2:
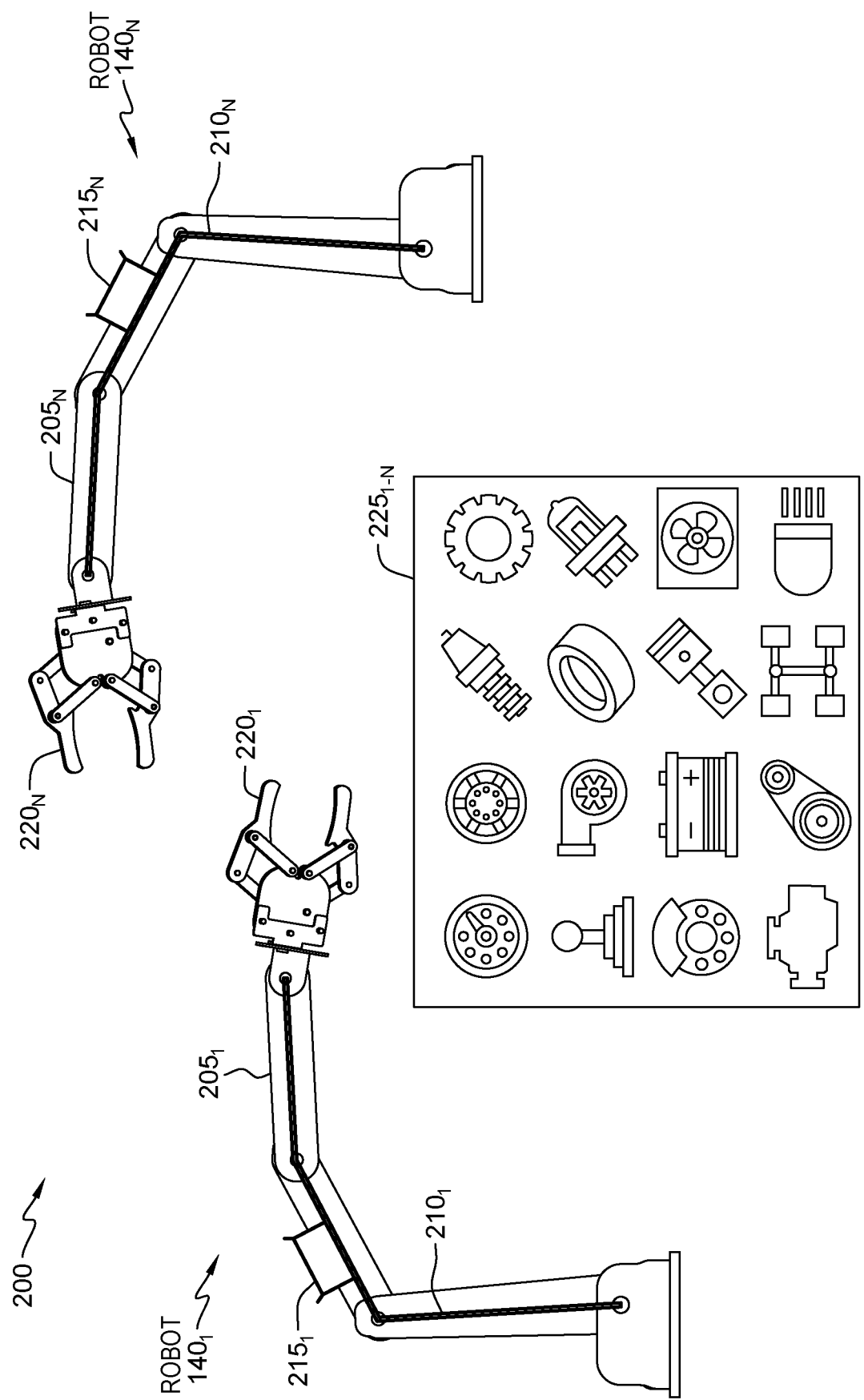
FIG. 2 is an exemplary diagram illustrating a plurality of components of a robotic arm, within the distributed data processing environment of FIG. 1, in accordance with an embodiment of the present invention.

Robot $140_{1-N}$ operates to assemble a product using a set of material (e.g., $225_{1-N}$ of FIG. 2). As used herein, N represents a positive integer, and accordingly the number of scenarios implemented in a given embodiment of the present invention is not limited to those depicted in FIG. 1. Referring to FIG. 2, FIG. 2 depicts an exemplary diagram, generally designated 200, illustrating a plurality of components of robot $140_{1-N}$, on the server within the distributed data processing environment of FIG. 1, in accordance with an embodiment of the present invention. A robot (e.g., $140_{1-N}$) includes an arm (e.g., $205_{1-N}$), a track (e.g., $210_{1-N}$), and a clamping system (e.g., $220_{1-N}$). An arm (e.g., $205_{1-N}$) of a robot (e.g., $140_{1-N}$) contains a track (e.g., $210_{1-N}$) for movement of a material (e.g., $225_{1-N}$). The track (e.g., $210_{1-N}$) runs from end to end of the arm (e.g., $205_{1-N}$) of the robot (e.g., $140_{1-N}$). The arm (e.g., $205_{1-N}$) of the robot (e.g., $140_{1-N}$) is a robotic arm used for several manufacturing applications, including material handling, processing operations, and assembly and inspection. The material (e.g., $225_{1-N}$) represents individual components, which may be spring, gear wheel, battery, control circuit, pivotal joint, body parts of any final product, etc. A motorized micro trolley (e.g., $215_{1-N}$) is attached to the track (e.g., $210_{1-N}$). The motorized micro trolley (e.g., $215_{1-N}$) carries the material (e.g., $225_{1-N}$) from a place of origination to a place of destination. The motorized micro trolley (e.g., $215_{1-N}$) contains a motor (not shown) to move the motorized micro trolley (e.g., $215_{1-N}$) along the track (e.g., $210_{1-N}$) to the place of destination. The motorized micro trolley (e.g., $215_{1-N}$) also contains a clamping system (e.g., $220_{1-N}$). The clamping system (e.g., $220_{1-N}$) grips the material (e.g., $225_{1-N}$) to pick and place the material (e.g., $225_{1-N}$) from the place of origination into the motorized micro trolley (e.g., $215_{1-N}$) or from the motorized micro trolley (e.g., $215_{1-N}$) to the place of destination.

Figure 3:
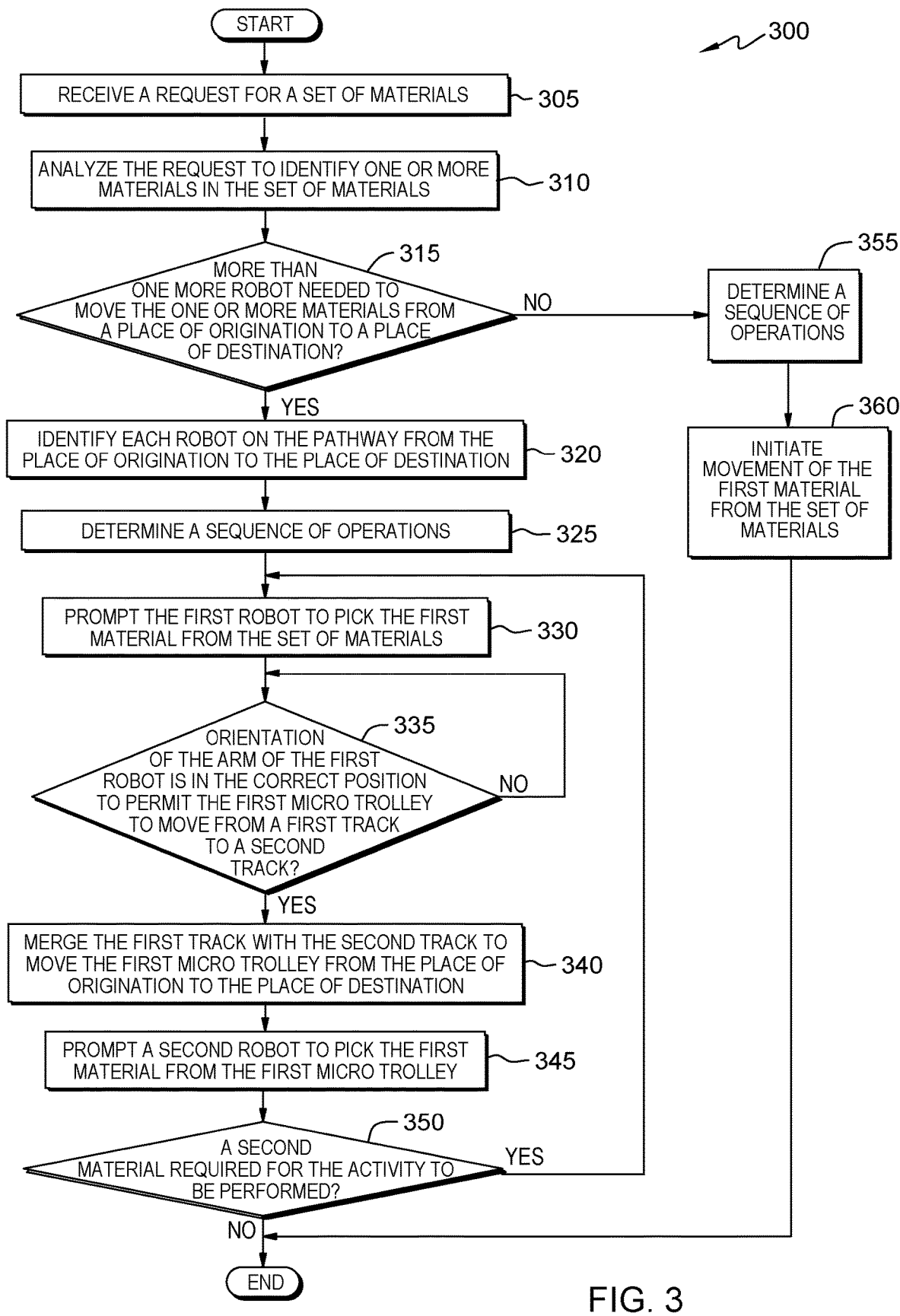
FIG. 3 is a flowchart illustrating the operational steps of a material movement program, running on a server within the distributed data processing environment of FIG. 1, in accordance with an embodiment of the present invention.

FIG. 3 is a flowchart, generally designated 300, illustrating the operational steps for material movement program 122, on server 120 within distributed data processing environment 100 of FIG. 1, in accordance with an embodiment of the present invention. In an embodiment, material movement program 122 operates to improve current robotic automation systems by adding a track that runs from end to end of an arm of a robot and that can move one or more materials with or without the help of a motorized micro trolley from a place of origination to a place of destination. It should be appreciated that the process depicted in FIG. 3 illustrates one possible iteration of the process flow, which may be repeated for each request for a set of materials received.

In step 305, material movement program 122 receives a request for a set of materials. In an embodiment, material movement program 122 receives a request for a set of materials from a user computing device (e.g., user computing device 130). In another embodiment, material movement program 122 retrieves a request for a set of materials from a database (e.g., database 124) of a server (e.g., server 120). The set of materials includes one or more materials (e.g., $225_{1-N}$) required for a robot (e.g., $140_{1-N}$) to assemble a product (e.g., a robotic toy or a wall clock). The robot (e.g., $140_{1-N}$) may include, but is not limited to, one or more manufacturing machines.

In step 310, material movement program 122 analyzes the request for the set of materials using a Natural Language Processing (NLP) technique. The NLP techniques include, but are not limited to, parsing, natural language understanding, and topic segmentation. In an embodiment, material movement program 122 analyzes the request for the set of materials to identify the one or more materials (e.g., $225_{1-N}$) in the set of materials. In an embodiment, material movement program 122 identifies the one or more materials (e.g., $225_{1-N}$) in the set of materials.

In an embodiment, material movement program 122 determines where the one or more materials (e.g., $225_{1-N}$) are to be picked up (hereinafter referred to as a "place of origination"). The place of origination may be, but is not limited to, a place where the one or more materials are stored or a place where the one or more materials have been partially assembled. In an embodiment, material movement program 122 determines where the one or more materials (e.g., $225_{1-N}$) are to be deposited (hereinafter referred to as a "place of destination"). The place of destination may be, but is not limited to, a place where the one or more materials are assembled (i.e., a robot (e.g., $140_X$) to which the one or more materials (e.g., $225_{1-N}$) will be moved).

In decision step 315, material movement program 122 determines whether more than one robot (e.g., $140_{1-N}$) is needed to move the one or more materials (e.g., $225_{1-N}$) from the place of origination to the place of destination. If material movement program 122 determines more than one robot (e.g., $140_{1-N}$) is needed to move the one or more materials (e.g., $225_{1-N}$) (decision step 315, YES branch), then material movement program 122 proceeds to step 320, identifying each robot (e.g., $140_{1-N}$) on the pathway from the place of origination to the place of destination. If material movement program 122 determines more than one robot (e.g., $140_{1-N}$) is not needed to move the one or more materials (e.g., $225_{1-N}$) (decision step 315, NO branch), then material movement program 122 proceeds to step 355, determining a sequence of operations to move a first material (e.g., $225_1$) of the one or more materials (e.g., $225_{1-N}$) along the pathway from the place of origination to the place of destination.

In step 320, material movement program 122 identifies each robot (e.g., $140_{1-N}$) on the pathway from the place of origination to the place of destination. In an embodiment, material movement program 122 determines where each robot (e.g., $140_{1-N}$) is located on the pathway from the place of origination to the place of destination. In an embodiment, material movement program 122 considers one or more factors relevant to each robot (e.g., $140_{1-N}$) on the pathway from the place of origination to the place of destination. The one or more factors considered may include, but are not limited to, a current activity being performed by each robot (e.g., $140_{1-N}$) and an amount of time required for the current activity to be performed.

In step 325, material movement program 122 determines a sequence of operations. In an embodiment, material movement program 122 determines a sequence of operations for the one or more materials by first determining when the one or more materials will be required by the robot and then determining whether the one or more materials can be aggregated in a micro trolley.

In an embodiment, material movement program 122 determines when (i.e., temporally) the one or more materials (e.g., $225_{1-N}$) will be required by the robot (e.g., $140_{1-N}$) from a historical analysis of the robot (e.g., $140_{1-N}$). For example, the historical analysis of the robot (e.g., $140_{1-N}$) may include, but is not limited to, one or more previous patterns of activity of the robot (e.g., $140_{1-N}$).

In an embodiment, material movement program 122 determines whether the one or more materials (e.g., $225_{1-N}$) can be aggregated (i.e., can be moved together) in a micro trolley (e.g., $215_1$) based on one or more factors. The one or more factors may include, but is not limited to, a place of origination of the one or more materials, a place of destination of the one or more materials, a quantity of the one or more materials, a size of the one or more materials, and a micro trolley (e.g., $215_1$) expected to be used to carry the one or more materials.

In an embodiment, material movement program 122 determines a sequence of operations to move the first material (e.g., $225_1$) along the pathway from the place of origination to the place of destination. In another embodiment, material movement program 122 determines a sequence of operations to concurrently move a plurality of materials (e.g., $225_{1-N}$) along the pathway from the place of origination to the place of destination. The sequence of operations may include, but is not limited to, one or more materials to be moved, an order the one or more materials will be moved, a first robot (e.g., $140_1$) to pick the one or more materials (e.g., $225_{1-N}$) from the set of materials at the place of origination, a second robot (e.g., $140_2$) to pick the one or more materials (e.g., $225_{1-N}$) from the first micro trolley (e.g., $215_1$) at the place of destination, a list of micro trolleys (e.g., $215_1$) to be used to carry the plurality of materials, a determination of which micro trolley (e.g., $215_{1-N}$) will carry which material, and a determination of whether any of the materials will be aggregated and moved together in a similar micro trolley.

In step 330, material movement program 122 prompts the first robot (e.g., $140_1$) to pick the first material (e.g., $225_1$) from the set of materials at the place of origination. In an embodiment, material movement program 122 enables the first robot (e.g., $140_1$) to deposit the first material (e.g., $225_1$) in the first micro trolley (e.g., $215_1$). In another embodiment, material movement program 122 enables the first robot (e.g., $140_1$) to deposit the first material (e.g., $225_1$) on a track (e.g., $210_1$) that runs from end to end of an arm (e.g., $205_1$) of the first robot (e.g., $140_1$). In an embodiment, material movement program 122 identifies an orientation of an arm (e.g., $205_1$) of the first robot (e.g., $140_1$).

In decision step 335, material movement program 122 determines whether the orientation of the arm (e.g., $205_1$) of the first robot (e.g., $140_1$) is in the correct position. In an embodiment, material movement program 122 determines whether the orientation of the arm (e.g., $205_1$) of the first robot (e.g., $140_1$) is in the correct position to permit the first micro trolley (e.g., $215_1$) to move from a first track (e.g., $210_1$) to a second track (e.g., $210_2$). In an embodiment, material movement program 122 determines whether the orientation of the arm of the first robot is in the correct position to move the first micro trolley from the place of origination to the place of destination in as few movements as possible. If material movement program 122 determines the orientation of the arm (e.g., $205_1$) of the first robot (e.g., $140_1$) is in the correct position (decision step 335, YES branch), then material movement program 122 proceeds to step 340, moving the first micro trolley (e.g., $215_1$) from the first track (e.g., $210_1$) to the second track (e.g., $210_2$). If material movement program 122 determines the orientation of the arm (e.g., $205_1$) of the first robot (e.g., $140_1$) is not in the correct position (decision step 335, NO branch), then material movement program 122 stops the first micro trolley (e.g., $215_1$) from moving any further until the arm (e.g., $205_1$) of the first robot (e.g., $140_1$) is in the correct position.

In step 340, material movement program 122 merges the first track (e.g., $210_1$) on the arm (e.g., $205_1$) of the first robot (e.g., $140_1$) with the second track (e.g., $210_2$) on the arm (e.g., $205_2$) of the second robot (e.g., $140_2$). In an embodiment, material movement program 122 moves the first micro trolley (e.g., $215_1$) along the first track (e.g., $210_1$) on the arm (e.g., $205_1$) of the first robot (e.g., $140_1$) to the second track (e.g., $210_2$) on the arm (e.g., $205_2$) of the second robot (e.g., $140_2$). In an embodiment, material movement program 122 creates a multi-robotic material movement track by aligning the first track (e.g., $210_1$) on the arm (e.g., $205_1$) of the first robot (e.g., $140_1$) with the second track (e.g., $210_2$) on the arm (e.g., $205_2$) of the second robot (e.g., $140_2$).

In step 345, at the place of destination, material movement program 122 prompts the second robot (e.g., $140_2$) to pick the first material (e.g., $225_1$) from the first micro trolley (e.g., $215_1$). The second robot (e.g., $140_2$) uses the clamping system (e.g., $220_{1-N}$) to grip the material (e.g., $225_1$) to pick and place the first material (e.g., $225_1$) from the motorized micro trolley (e.g., $215_{1-N}$) to the place of destination. In an embodiment, after the second robot (e.g., $140_2$) picks the first material (e.g., $225_1$) from the first micro trolley (e.g., $215_1$), material movement program 122 returns the first micro trolley (e.g., $215_1$) to the place of origination.

In an embodiment, material movement program 122 checks the first material (e.g., $225_1$) for quality issues (i.e., pass or fail a quality check). If material movement program 122 determines there is a quality issue with the first material, then material movement program 122 returns to step 330, prompting the first robot (e.g., $140_1$) to pick the first material (e.g., $225_1$) from the first set of materials again. If material movement program 122 determines there is not a quality issue with the first material, then material movement program 122 proceeds to decision step 350, determining whether there is a second material (e.g., $225_2$) required for the activity to be performed by the robot (e.g., $140_{1-N}$).

In decision step 350, material movement program 122 determines whether there is a second material (e.g., $225_2$) required for the activity to be performed by the robot (e.g., $140_{1-N}$). In an embodiment, material movement program 122 determines whether there is a second material (e.g., $225_2$) required for the activity to be performed by the robot (e.g., $140_{1-N}$) by referring to the request received in step 305. If material movement program 122 determines there is a second material (e.g., $225_2$) required for the activity to be performed by the robot (e.g., $140_{1-N}$) (decision step 350, YES branch), then material movement program 122 returns to step 330, prompting the first robot (e.g., $140_1$) to pick the second material (e.g., $225_2$) from the one or more materials proactively (i.e., without any discontinuity in the activity to be performed by the robot (e.g., $140_{1-N}$). If material movement program 122 determines there is not a second material (e.g., $225_2$) required for the activity to be performed by the robot (e.g., $140_{1-N}$) (decision step 350, NO branch), then material movement program 122 ends.

Returning to when material movement program 122 determines more than one robot (e.g., $140_{1-N}$) is not needed to move the one or more materials (e.g., $225_{1-N}$) (decision step 315, NO branch), then material movement program 122 proceeds to step 355. In step 355, material movement program 122 determines a sequence of operations. In an embodiment, material movement program 122 determines a sequence of operations for the one or more materials by first determining when the one or more materials will be required by the robot and then determining whether the one or more materials can be aggregated in a micro trolley.

In an embodiment, material movement program 122 determines when the one or more materials (e.g., $225_{1-N}$) will be required by the robot (e.g., $140_X$) from a historical analysis of the robot (e.g., $140_X$). For example, the historical analysis of the robot (e.g., $140_X$) may include, but is not limited to, one or more previous patterns of activity of the robot (e.g., $140_X$).

In an embodiment, material movement program 122 determines whether the one or more materials (e.g., $225_{1-N}$) can be aggregated (i.e., can be moved together) in a micro trolley (e.g., $215_1$) based on one or more factors. The one or more factors may include, but is not limited to, a place of origination of the one or more materials, a place of destination of the one or more materials, a quantity of the one or more materials, a size of the one or more materials, and a micro trolley (e.g., $215_1$) expected to be used to carry the one or more materials.

In an embodiment, material movement program 122 determines a sequence of operations to move a first material (e.g., $225_1$) of the one or more materials (e.g., $225_{1-N}$) along the pathway from the place of origination to the place of destination. In another embodiment, material movement program 122 determines a sequence of operations to concurrently move a plurality of materials (e.g., $225_{1-N}$) of the one or more materials (e.g., $225_{1-N}$) along the pathway from the place of origination to the place of destination. The sequence of operations may include, but is not limited to, one or more materials to be moved, an order the one or more materials will be moved, a micro trolley (e.g., $215_1$) that will carry the one or more materials to be moved, and a determination of whether any of the materials will be aggregated and moved together in a similar micro trolley.

In step 360, material movement program 122 initiates movement of the one or more materials from the place of origination to the place of destination. In an embodiment, material movement program 122 initiates movement by placing the one or more materials in a first micro trolley (e.g., $215_1$) that moves on the track (e.g., $210_1$) that runs from end to end of an arm (e.g., $205_1$) of the robot (e.g., $140_1$). In another embodiment, material movement program 122 initiates movement by placing the one or more materials on a track (e.g., $210_X$) that runs from end to end of an arm (e.g., $205_X$) of the robot (e.g., $140_X$). In an embodiment, responsive to the one or more materials reaching the place of destination in the first micro trolley (e.g., $215_1$), material movement program 122 returns the first micro trolley (e.g., $215_1$) to the place of origination.

In an embodiment, material movement program 122 checks the first material (e.g., $225_1$) for quality issues (i.e., pass or fail a quality check). If material movement program 122 determines there is a quality issue with the first material, then material movement program 122 prompts the first robot (e.g., $140_1$) to pick the first material (e.g., $225_1$) from the first set of materials again. If material movement program 122 determines there is not a quality issue with the first material, then material movement program 122 ends.

Figure 4:
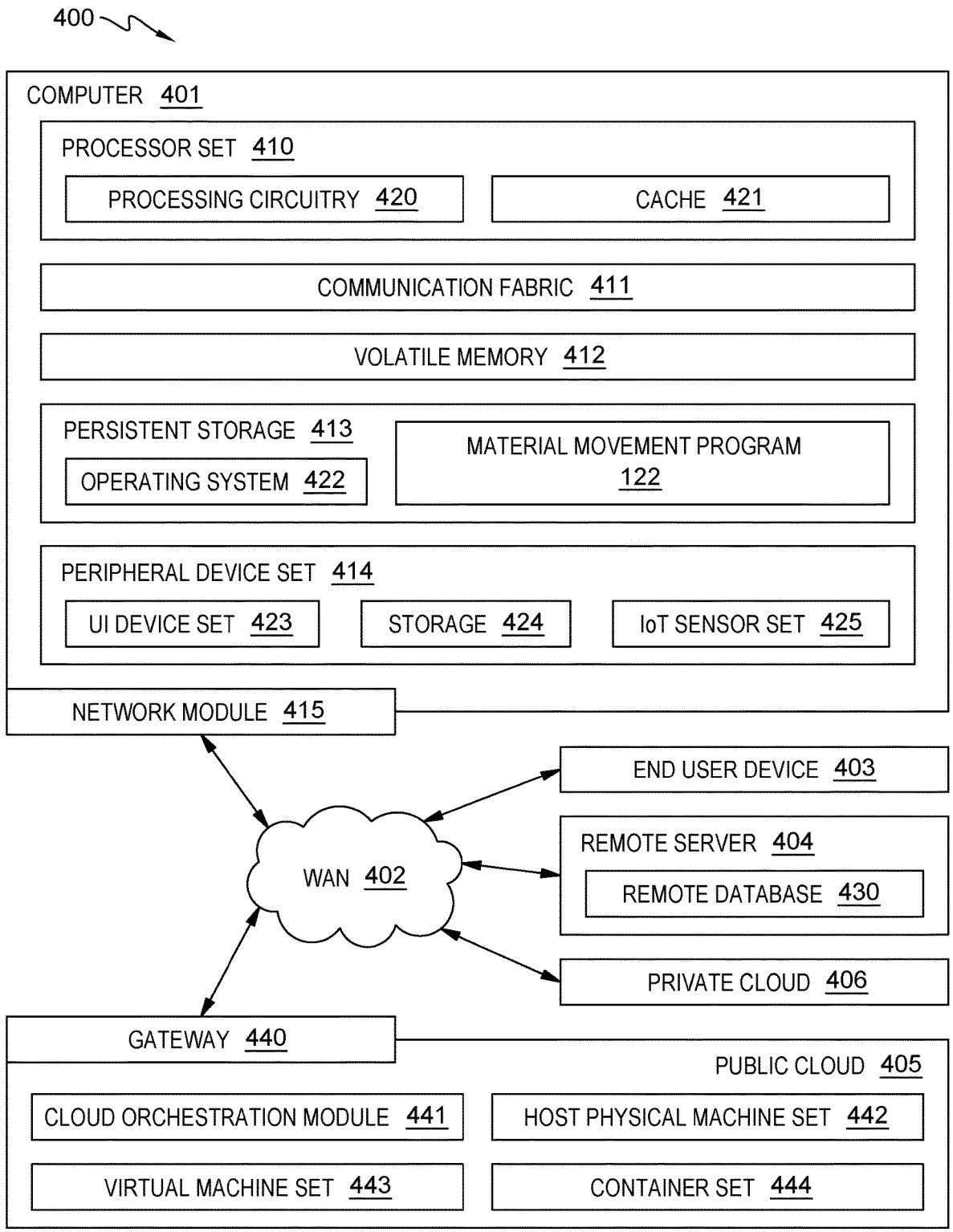
FIG. 4 is a block diagram illustrating a computer system capable of implementing the material movement program of FIG. 1, in accordance with an embodiment of the present invention.

FIG. 4 depicts a block diagram of components of server 120 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing environment 400 contains an example of an environment for the execution of at least some of the computer code involved in performing the inventive methods, such as material movement program 122 for mixed reality scenario generation for cross industry training. In addition to material movement program 122, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and material movement program 122, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in material movement program 122 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in material movement program 122 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to receiving a request for a set of materials required for an activity to be performed by a robotic system, identifying, by one or more processors, one or more materials of the set of materials;
determining, by one or more processors, a sequence of operations to move the one or more materials from a place of origination to a place of destination;
prompting, by one or more processors, a first robot to pick a first material from the set of materials at the place of origination using a clamping system and to deposit the first material in a first micro trolley;
responsive to determining an arm of the first robot is in a first orientation to move the first micro trolley from the place of origination to the place of destination, moving, by one or more processors, the first material in the first micro trolley along a first track on an arm of a multi-robotic system from the place of origination to the place of destination; and
prompting, by one or more processors, a second robot to pick the first material from the first micro trolley at the place of destination using the clamping system.

2. The computer-implemented method of claim 1, wherein identifying the one or more materials of the set of materials further comprises:
determining, by one or more processors, where the one or more materials are to be picked up; and
determining, by one or more processors, where the one or more materials are to be deposited.

3. The computer-implemented method of claim 1, wherein determining the sequence of operations to move the one or more materials from the place of origination to the place of destination further comprises:
determining, by one or more processors, when the one or more materials will be required for the activity; and
determining, by one or more processors, whether the one or more materials can be aggregated in the first micro trolley based on one or more factors.

4. The computer-implemented method of claim 3, wherein the one or more factors includes each respective place of origination of the one or more materials, each respective place of destination of the one or more materials, a quantity of the one or more materials, a size of the one or more materials, and each respective micro trolley expected to be used to carry the one or more materials.

5. The computer-implemented method of claim 1, further comprising:
prior to determining the sequence of operations to move the one or more materials from the place of origination to the place of destination, identifying, by one or more processors, one or more robots on a pathway from the place of origination to the place of destination;
determining, by one or more processors, a location of each robot of the one or more robots on the pathway from the place of origination to the place of destination; and
considering, by one or more processors, one or more factors relevant to each robot of the one or more robots on the pathway from the place of origination to the place of destination.

6. The computer-implemented method of claim 5, wherein the one or more factors includes a current activity being performed by each robot of the one or more robots on the pathway from the place of origination to the place of destination and an amount of time required for the current activity to be performed.

7. The computer-implemented method of claim 1, wherein the sequence of operations includes a selection from the group consisting of: one or more materials to be moved, an order the one or more materials will be moved, a first robot to pick the one or more materials from the set of materials at the place of origination, a second robot to pick the one or more materials from the first micro trolley at the place of destination, a list of micro trolleys to be used to carry the set of materials, a determination of which micro trolley will carry which material, and a determination of whether any of the one or more materials will be aggregated and moved together in a similar micro trolley.

8. The computer-implemented method of claim 1, wherein prompting the first robot to pick the first material from the set of materials at the place of origination using the clamping system and to deposit the first material in the first micro trolley further comprises:
identifying, by one or more processors, an orientation of the arm of the first robot; and
determining, by one or more processors, the arm of the first robot is in a first orientation.

9. The computer-implemented method of claim 1, further comprising:
prior to moving the first material in the first micro trolley along the first track on the arm of the multi-robotic system from the place of origination to the place of destination, creating, by one or more processors, a multi-robotic material movement track by aligning the first track on the arm of the first robot with a second track on the arm of the second robot.

10. The computer-implemented method of claim 1, further comprising:
subsequent to prompting the second robot to pick the first material from the first micro trolley at the place of destination using the clamping system, checking, by one or more processors, the first material for a quality issue; and
responsive to determining there is a quality issue with the first material, prompting, by one or more processors, the first robot to pick the first material from the set of materials again.

11. The computer-implemented method of claim 1, further comprising:
subsequent to prompting the second robot to pick the first material from the first micro trolley at the place of destination using the clamping system, returning, by one or more processors, the first micro trolley to the place of origination; and
determining, by one or more processors, there is a second material from the set of materials required for the activity to be performed by the robotic system.

12. The computer-implemented method of claim 11, further comprising:
responsive to determining there is a second material required for the activity to be performed by the robotic system, prompting, by one or more processors, the first robot to pick the second material from the one or more materials proactively without any discontinuity in the activity to be performed by the robotic system.

13. A computer program product comprising:
one or more computer readable hardware storage media; and
program instructions stored on the one or more computer readable hardware storage media to perform operations comprising:
responsive to receiving a request for a set of materials required for an activity to be performed by a robotic system, identifying one or more materials of the set of materials;
determining a sequence of operations to move the one or more materials from a place of origination to a place of destination;
prompting a first robot to pick a first material from the set of materials at the place of origination using a clamping system and to deposit the first material in a first micro trolley;
responsive to determining an arm of the first robot is in a first orientation to move the first micro trolley from the place of origination to the place of destination, moving the first material in the first micro trolley along a first track on an arm of a multi-robotic system from the place of origination to the place of destination; and
prompting a second robot to pick the first material from the first micro trolley at the place of destination using the clamping system.

14. The computer program product of claim 13, wherein prompting the first robot to pick the first material from the set of materials at the place of origination using the clamping system and to deposit the first material in the first micro trolley further comprises:
identifying an orientation of the arm of the first robot; and
determining the arm of the first robot is in a first orientation.

15. The computer program product of claim 13, wherein the operations further comprise:
prior to moving the first material in the first micro trolley along the first track on the arm of the multi-robotic system from the place of origination to the place of destination, creating a multi-robotic material movement track by aligning the first track on the arm of the first robot with a second track on the arm of the second robot.

16. The computer program product of claim 13, wherein the operations further comprise:
subsequent to prompting the second robot to pick the first material from the first micro trolley at the place of destination using the clamping system, checking the first material for a quality issue; and
responsive to determining there is a quality issue with the first material, prompting the first robot to pick the first material from the set of materials again.

17. A computer system comprising:
one or more computer processors;
one or more computer readable storage media; and
program instructions stored on the one or more computer readable storage media to cause the processor set to perform operations comprising:
responsive to receiving a request for a set of materials required for an activity to be performed by a robotic system, identifying one or more materials of the set of materials;
determining a sequence of operations to move the one or more materials from a place of origination to a place of destination;
prompting a first robot to pick a first material from the set of materials at the place of origination using a clamping system and to deposit the first material in a first micro trolley;
responsive to determining an arm of the first robot is in a first orientation to move the first micro trolley from the place of origination to the place of destination, moving the first material in the first micro trolley along a first track on an arm of a multi-robotic system from the place of origination to the place of destination; and
prompting a second robot to pick the first material from the first micro trolley at the place of destination using the clamping system.

18. The computer system of claim 17, wherein prompting the first robot to pick the first material from the set of materials at the place of origination using the clamping system and to deposit the first material in the first micro trolley further comprises:
identifying an orientation of the arm of the first robot; and
determining the arm of the first robot is in a first orientation.

19. The computer system of claim 17, wherein the operations further comprises:
prior to moving the first material in the first micro trolley along the first track on the arm of the multi-robotic system from the place of origination to the place of destination, creating a multi-robotic material movement track by aligning the first track on the arm of the first robot with a second track on the arm of the second robot.

20. The computer system of claim 17, further comprising:
subsequent to prompting the second robot to pick the first material from the first micro trolley at the place of destination using the clamping system, checking the first material for a quality issue; and
responsive to determining there is a quality issue with the first material, prompting the first robot to pick the first material from the set of materials again.

* * * * *